US012759858B2

(12) United States Patent
Alexander et al.

(10) Patent No.: US 12,759,858 B2
(45) Date of Patent: *Oct. 13, 2026

(54) CHILLED BEVERAGE DISPENSING SYSTEM

(71) Applicant: Ember Technologies, Inc., Westlake Village, CA (US)

(72) Inventors: Clayton Alexander, Westlake Village, CA (US); Daren John Leith, Agoura Hills, CA (US); Damian Lee, Westlake Village, CA (US); Rahul Mulinti, Westlake Village, CA (US); Erik Aaron Camacho Covarrubias, Simi Valley, CA (US); Mikko Juhani Timperi, San Marcos, CA (US); Jacob William Emmert, Westchester, CA (US); Fangyi Gao, Temple City, CA (US)

(73) Assignee: Ember Technologies, Inc., Westlake Village, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 18/600,381

(22) Filed: Mar. 8, 2024

(65) Prior Publication Data

US 2024/0300799 A1 Sep. 12, 2024

Related U.S. Application Data

(60) Provisional application No. 63/518,410, filed on Aug. 9, 2023, provisional application No. 63/489,391, filed on Mar. 9, 2023.

(51) Int. Cl.
*B67D 1/08* (2006.01)

(52) U.S. Cl.
CPC .................................. *B67D 1/0869* (2013.01)

(58) Field of Classification Search
None
See application file for complete search history.

(56) References Cited

U.S. PATENT DOCUMENTS 2,653,013 A * 9/1953 Freer .................... F25D 31/002 165/47
3,324,667 A * 6/1967 Muller .................... F25B 21/02 62/332
(Continued)

FOREIGN PATENT DOCUMENTS

CN 2694359 Y 4/2005
CN 102 410 659 B 6/2014
(Continued)

OTHER PUBLICATIONS

International Search Report and Written Opinion dated Jul. 2, 2024, received in International Patent Application No. PCT/US2024/018721, in 10 pages.
(Continued)

*Primary Examiner* — Jenna M Maroney
(74) *Attorney, Agent, or Firm* — Knobbe, Martens, Olson & Bear LLP

(57) ABSTRACT

A chilled liquid dispensing system includes a vessel with phase change material that can be charged by a thermoelectric module via a first heat sink. A liquid (e.g., beverage) can be pumped through a conduit submerged in the phase change material to cool or chill the liquid to a temperature below ambient temperature. The chilled liquid dispensing system can be incorporated into a liquid dispensing machine (e.g., beverage dispensing machine).

19 Claims, 14 Drawing Sheets

(56) References Cited

U.S. PATENT DOCUMENTS 4,055,053 A * 10/1977 Elfving .................... F25B 21/02 62/344
4,320,626 A * 3/1982 Donnelly ................ F25B 21/02 62/394
4,407,356 A * 10/1983 DeLau .................. F28D 1/0213 165/169
4,624,395 A * 11/1986 Baron ................... A47J 31/401 D7/308
4,829,771 A * 5/1989 Koslow .................. F25B 21/02 62/3.64
5,367,879 A * 11/1994 Doke ...................... F25B 21/02 62/3.6
5,860,280 A * 1/1999 Recine, Sr. .......... B67D 3/0009 62/400
5,918,468 A 7/1999 Cassells et al.
5,946,918 A * 9/1999 Greene ................. F25D 31/003 62/393
6,119,464 A * 9/2000 Nakayama .............. F25D 21/02 62/139
6,131,393 A * 10/2000 Greene ................ B67D 3/0029 62/3.64
6,442,960 B1 9/2002 Fournier
9,357,874 B2 6/2016 Licare
9,797,652 B1 * 10/2017 Wilkerson ............ F25D 31/002
9,995,529 B1 6/2018 Banks
10,151,523 B2 12/2018 Sadot et al.
11,297,976 B2 * 4/2022 Freedman .............. A23G 9/083
11,313,604 B2 4/2022 Oh
11,470,855 B2 10/2022 Fonte et al.
11,493,269 B2 * 11/2022 Caswell ................... B67D 3/00
11,529,020 B2 12/2022 Perentes et al.
11,713,232 B2 8/2023 Rudick
2002/0162339 A1 * 11/2002 Harrison ................. F25B 21/02 62/3.2
2005/0172952 A1 8/2005 Williams
2005/0224214 A1 * 10/2005 Zeighami .................. F28F 1/32 165/104.21
2007/0056296 A1 * 3/2007 Gagliano .............. F25D 31/003 62/3.64
2008/0010999 A1 1/2008 Sonnenrein
2008/0282705 A1 11/2008 Hue et al.
2010/0212333 A1 * 8/2010 Moon .................. B67D 1/0009 62/85
2010/0281909 A1 11/2010 Carpanzano
2013/0062366 A1 * 3/2013 Tansey ................. B67D 1/0809 222/101
2014/0318152 A1 10/2014 Ghoshal
2016/0073819 A1 * 3/2016 Licare ................... A47J 31/467 99/300
2016/0107876 A1 * 4/2016 Mackey .................... F28D 1/06 62/331
2016/0313047 A1 10/2016 Sodot
2016/0339822 A1 11/2016 Park et al.
2017/0234610 A1 8/2017 Jones
2019/0300358 A1 * 10/2019 Maier .................. B67D 1/0888
2020/0208909 A1 * 7/2020 Chang .................. B67D 1/0859
2020/0408452 A1 12/2020 Alexander
2021/0310729 A1 10/2021 Alexander et al.
2021/0380390 A1 * 12/2021 Fantappie ............... F25D 16/00
2022/0340406 A1 10/2022 Lynch
2023/0266058 A1 8/2023 Alexander et al.
2024/0300799 A1 * 9/2024 Alexander ........... B67D 1/0869
2024/0409389 A1 * 12/2024 Alexander .............. F25B 40/00

FOREIGN PATENT DOCUMENTS

CN 102410659 A 6/2014
CN 205717913 U * 11/2016
CN 103841862 B * 10/2017 ......... B65D 75/5811
CN 107917564 A 4/2018
CN 112629149 A * 4/2021 .......... A47J 31/4403
CN 113854823 A * 12/2021 ........... F25D 31/005
CN 113854824 A * 12/2021 ............. F25D 17/02
CN 120101415 A * 6/2025 ............. F25D 17/02
DE 4036210 A1 5/1992
DE 202016107188 U1 * 3/2017 ............. C09K 5/063
DE 202017005461 U1 11/2017
ES 2372458 B1 1/2012
JP H08-21679 A 1/1996
JP 2002 351438 A 12/2002
JP 2004 319658 A 11/2004
JP 2007-181479 A 7/2007
KR 20-2009-0001178 2/2009
KR 10-0944128 B1 2/2010
KR 20130085669 A 7/2013
KR 10-2014-0145676 12/2014
KR 10-2018-0035662 4/2018
RU 2497056 C2 * 10/2013 ........... B67D 1/0867
WO WO 2013124778 A1 8/2013
WO WO-2015118704 A1 * 8/2015 ................ F04F 5/10
WO WO 2015/148346 A1 10/2015
WO WO 2019/152219 A1 8/2019
WO WO-2021068396 A1 * 4/2021 .......... A47J 31/4403
WO WO 2024096288 A1 5/2024
WO WO-2024165326 A1 * 8/2024 ........... F25D 31/002

OTHER PUBLICATIONS

CN-2694359-Y English Translation (Year: 2005).
DE-202017005461-U1 English Translation (Year: 2017).
JP H0821679 A English Translation (Year: 1996).
KR-20130085669-A English Translation (Year: 2013).
WO-2024096288-A1 English Translation (Year: 2024).

* cited by examiner

CHILLED BEVERAGE DISPENSING SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is directed to a beverage dispensing system, and more particularly to a chilled beverage dispensing system.

Description of the Related Art

Chilled brewed beverages (e.g., tea, coffee) are popular. Often, they are prepared by pouring a brewed hot beverage (e.g., coffee, tea) into a container filled with ice to cool down the beverage. However, this is a deficient process in that ice can dilute the beverage, affecting its flavor.

SUMMARY

In accordance with one aspect of the disclosure, an improved chilled beverage dispensing system is provided that can chill a hot brewed beverage without diluting the beverage.

In accordance with another aspect of the disclosure, a beverage dispensing machine is provided that includes a chilled beverage dispensing system that can chill a hot beverage brewed by the beverage dispensing machine prior to dispensing the beverage from the machine.

In accordance with another aspect of the disclosure, a chilled beverage dispensing system includes a thermal conditioning unit with phase change material that can be charged by a thermal engine having one or more thermoelectric elements. A beverage can be pumped through a tube loop in the thermal conditioning unit to cool or chill the beverage to a temperature below ambient temperature. The chilled beverage dispensing system can be incorporated into a beverage dispensing machine.

In accordance with one aspect of the disclosure, a chilled beverage dispensing system is provided. The system includes a reservoir that receives a hot beverage, and a beverage to air heat exchanger operable to receive the hot beverage from the reservoir and to cool the beverage to a warm beverage temperature above ambient by flowing air from one or more fans past a tube loop via the hot beverage flows through. The system also includes a thermal conditioning unit comprising an insulated vessel containing a phase change material, a tube loop for flowing the warm beverage through the phase change material to cool the warm beverage to a chilled beverage temperature having a temperature below ambient temperature, and a tube loop for flowing a coolant through the phase change material to cool the phase change material to charge the phase change material. The coolant is cooled by a thermoelectric element via a heat exchanger, the thermoelectric element in thermal communication with the heat exchanger and with a heat sink.

In accordance with another aspect of the disclosure, a beverage dispensing machine is provided. The machine comprises a housing, a hot beverage brewing unit disposed in the housing, and a chilled beverage dispensing system disposed in the housing and in fluid communication with the hot beverage brewing unit. The chilled beverage dispensing system includes a reservoir that receives a hot beverage from the hot beverage brewing unit, and a beverage to air heat exchanger operable to receive the hot beverage from the reservoir and to cool the beverage to a warm beverage temperature above ambient by flowing air from one or more fans past a tube loop via the hot beverage flows through. The system also includes a thermal conditioning unit comprising an insulated vessel containing a phase change material, a tube loop for flowing the warm beverage through the phase change material to cool the warm beverage to a chilled beverage temperature having a temperature below ambient temperature, and a tube loop for flowing a coolant through the phase change material to cool the phase change material to charge the phase change material. The coolant is cooled by a thermoelectric element via a heat exchanger, the thermoelectric element in thermal communication with the heat exchanger and with a heat sink.

In some aspects, the techniques described herein relate to a chilled liquid dispensing system, including: an insulated vessel having a chamber containing a phase change material; a conduit disposed in the chamber of the insulated vessel and having a portion submerged in the phase change material so that the phase change material is in thermal contact with an outer surface of the portion of the conduit, the conduit configured to receive therethrough a liquid at a first temperature above an ambient temperature that cools as it flows through the conduit and heat is transferred to the phase change material to cool the liquid to a second temperature below the ambient temperature; a first heat sink disposed in the chamber of the insulated vessel and submerged in the phase change material so that the phase change material is in thermal contact with an outer surface of the first heat sink; a thermoelectric module having one side in thermal communication with the first heat sink; and a second heat sink disposed outside the chamber of the insulated vessel and in thermal communication with an opposite side of the thermoelectric module, wherein the thermoelectric module is operable to charge or freeze the phase change material by pumping heat out of the phase change material via the first heat sink and into the second heat sink.

In some aspects, the techniques described herein relate to a system, wherein air flows past the second heat sink to remove heat from the second heat sink.

In some aspects, the techniques described herein relate to a system, further including one or more fans operable to flow air past the second heat sink to remove heat from the second heat sink.

In some aspects, the techniques described herein relate to a system, wherein the conduit includes a continuous tube spiral with multiple spaced apart tube loops, the continuous tube spiral extending circumferentially about the first heat sink within the chamber.

In some aspects, the techniques described herein relate to a system, wherein the insulated vessel is a double-walled vacuum insulated vessel.

In some aspects, the techniques described herein relate to a system, further including a second insulated vessel surrounding the insulated vessel.

In some aspects, the techniques described herein relate to a system, further including a cover configured to close the insulated vessel, the second heat sink extending through the cover.

In some aspects, the techniques described herein relate to a system, wherein an inlet and an outlet of the conduit extend through the cover.

In some aspects, the techniques described herein relate to a system, further including an insulated cover configured to cover the cover.

In some aspects, the techniques described herein relate to a system, wherein the first heat sink includes one or more heat pipes that are submerged in the phase change material.

In some aspects, the techniques described herein relate to a system, wherein the one or more heat pipes are two spaced apart heat pipes.

In some aspects, the techniques described herein relate to a system, wherein the first heat sink includes one or more fins extending from the one or more heat pipes, the one or more fins being submerged in the phase change material.

In some aspects, the techniques described herein relate to a system, wherein the one or more fins are a plurality of fins that extend perpendicular to the one or more heat pipes.

In some aspects, the techniques described herein relate to a system, wherein the one or more fins extend radially from the one or more heat pipes and along a length of the one or more heat pipes.

In some aspects, the techniques described herein relate to a system, further including a heat spreader attached to the first heat sink, disposed in the chamber and extending circumferentially about an axis of the insulated vessel.

In some aspects, the techniques described herein relate to a system, wherein the heat spreader extends circumferentially about the conduit, the conduit including a continuous tube spiral with multiple spaced apart tube loops.

In some aspects, the techniques described herein relate to a system, wherein the heat spreader includes a plurality of folded fins.

In some aspects, the techniques described herein relate to a system, further including: a reservoir configured to receive a liquid at a first temperature above an ambient temperature; and a heat exchanger operable to receive the liquid from the reservoir and to cool the liquid to a second temperature below the first temperature and above the ambient temperature by flowing air past a second conduit within which the liquid is configured to flow, the second conduit being upstream of an inlet to the conduit.

In some aspects, the techniques described herein relate to a beverage dispensing machine, including the chilled liquid dispensing system.

In some aspects, the techniques described herein relate to a beverage dispensing machine, further including a housing, and a hot beverage brewing unit disposed in the housing, the chilled beverage dispensing system disposed in the housing and in fluid communication with the hot beverage brewing unit.

In some aspects, the techniques described herein relate to a beverage dispensing machine, wherein the chilled liquid dispensing system is removable as a unit.

DETAILED DESCRIPTION

Figure 1:
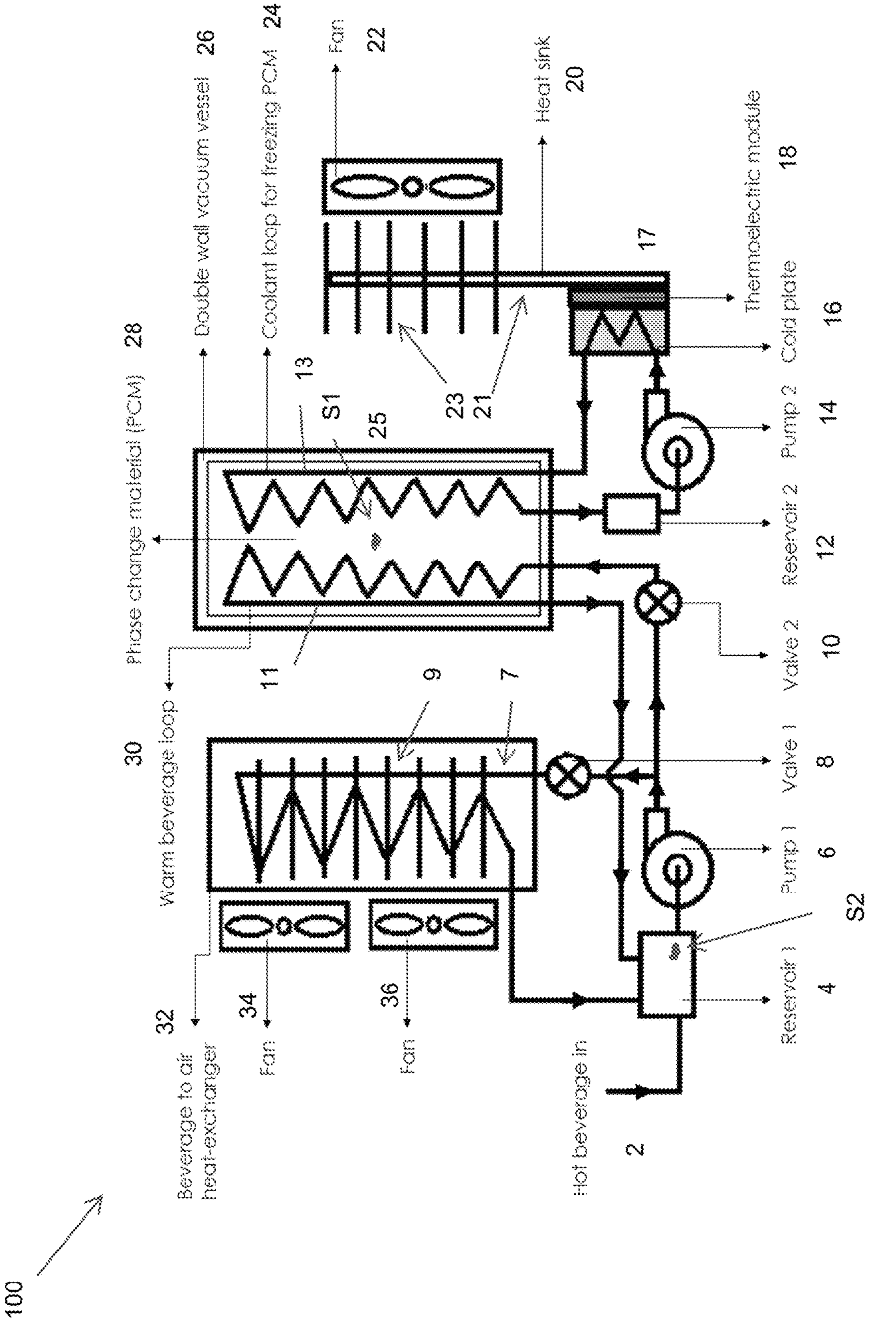
FIG. 1 is a diagram of a chilled beverage dispensing system.
Figure 2:
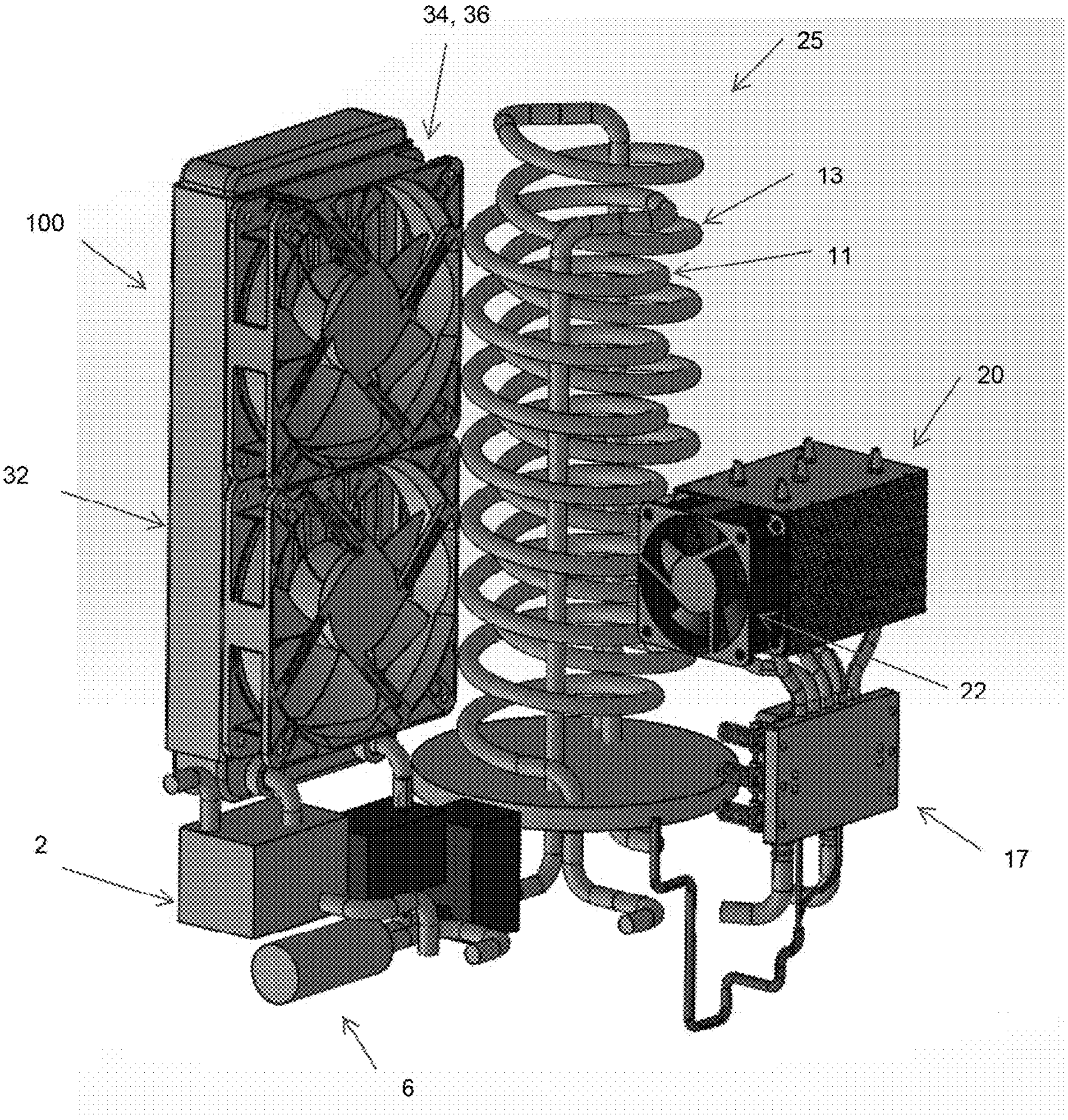
FIG. 2 is a schematic view of the chilled beverage dispensing system of FIG. 1.
Figure 3:
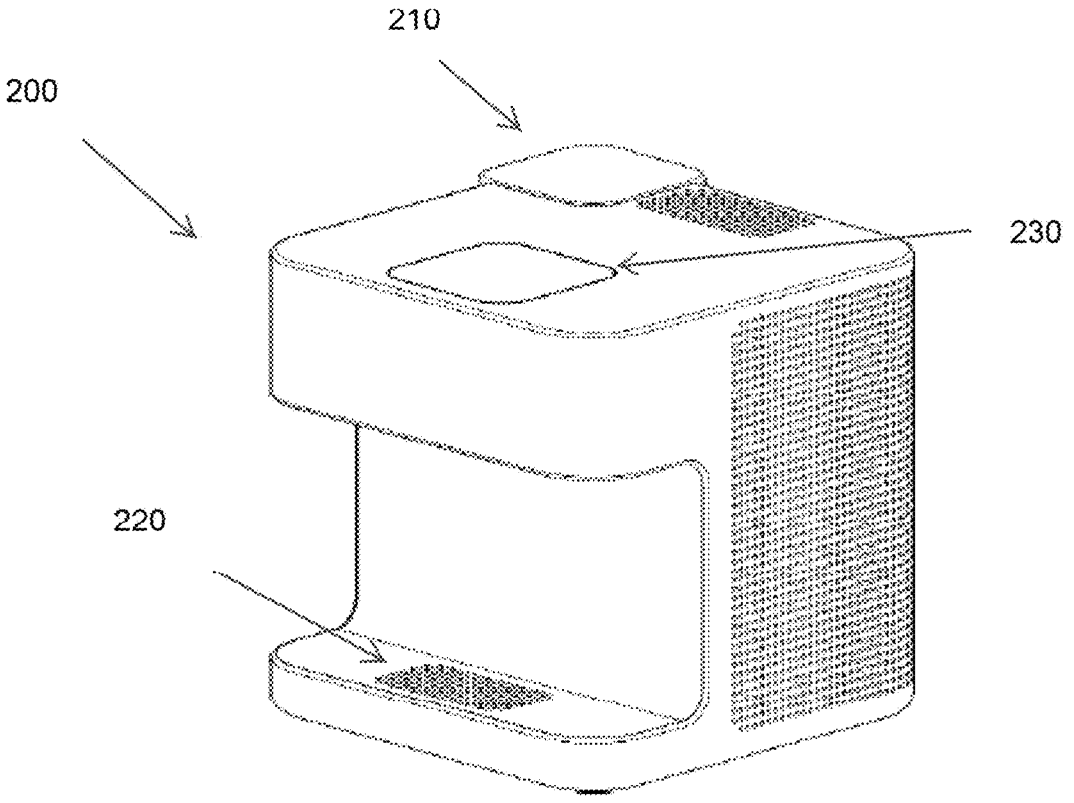
FIG. 3 is a schematic perspective view of a beverage dispensing machine incorporating the chilled beverage dispensing system of FIG. 1.
Figure 4:
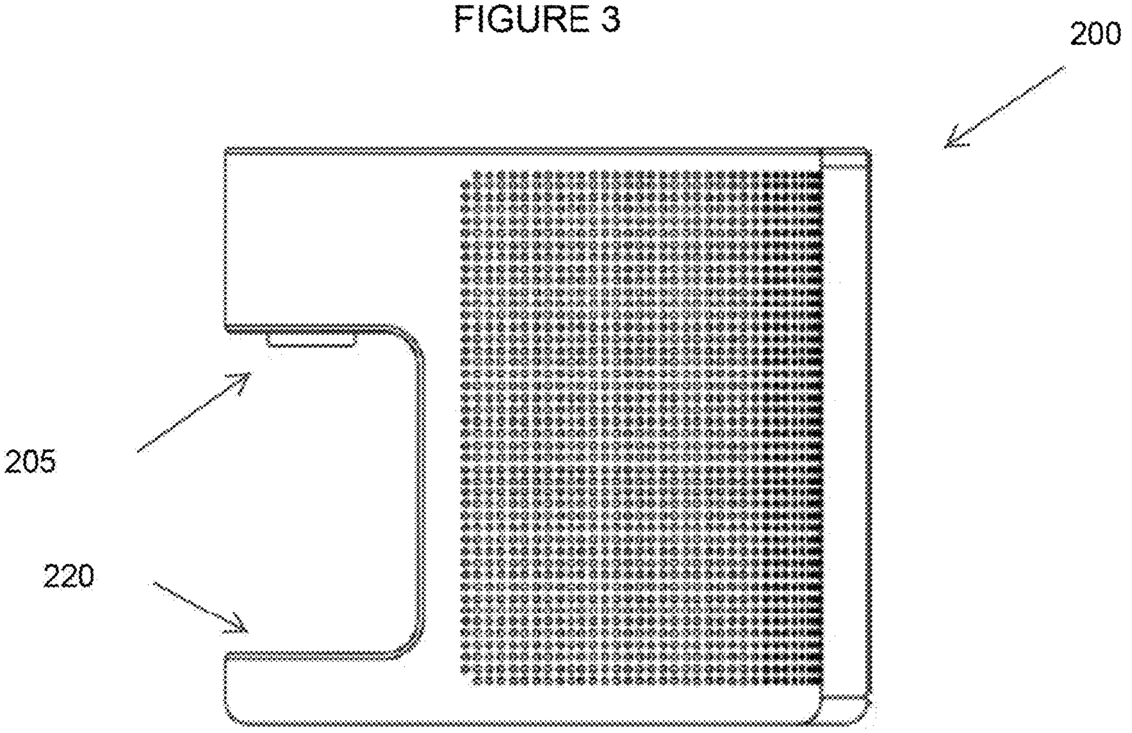
FIG. 4 is a side view of the beverage dispensing machine of FIG. 3.
Figure 5:
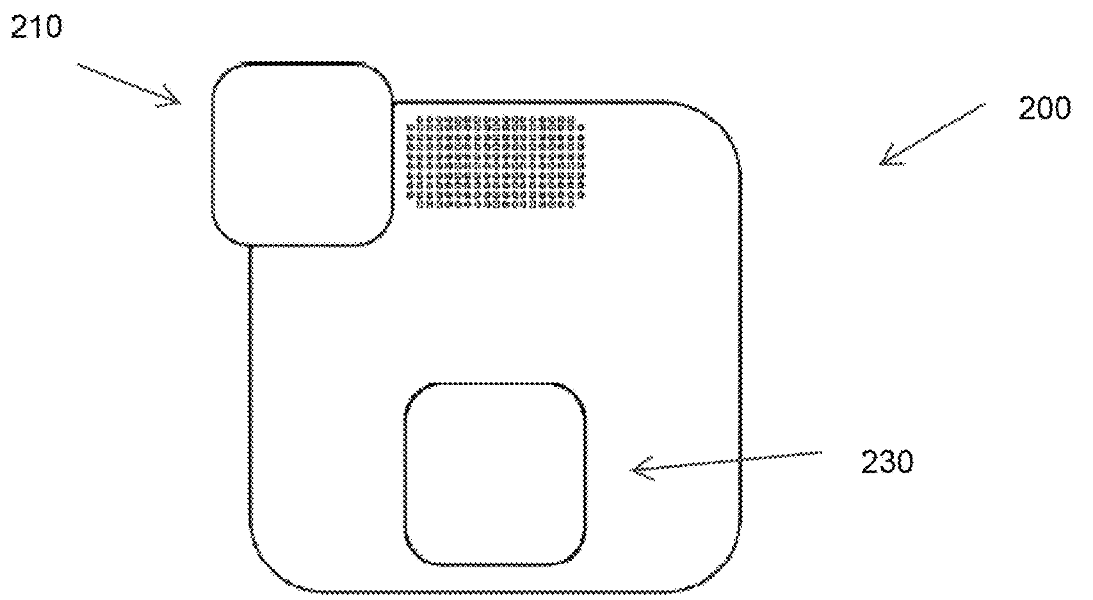
FIG. 5 is a top view of the beverage dispensing machine of FIG. 3.

FIGS. 1-2 shows a chilled beverage dispensing system 100 (hereafter "the system 100") operable to cool (e.g., chill) a hot beverage 2 directed to the system 100. The system 100 has a thermal conditioning unit 25 that can include an insulated vessel 26 housing a phase change material (PCM) 28. In one example, the PCM 28 can be water or ice, a water based PCM, or a material with a lower melting point (e.g., a melting point between about −5° C. and about 5° C., such as a melting point of about −5° C., a melt point of about 5° C., etc.). In one implementation, the insulated vessel 26 can be a double-walled vessel with a gap in between the two walls. In one example, the gap is under vacuum. In another example, the gap is filled with an insulating material (e.g., foam). In another example, the gap is filled with air. One or more temperature sensors S1 are in thermal communication with the PCM 28 and operable to monitor a temperature of the PCM 28 and communicate the sensed temperature to a controller (not shown) that controls the operation of the system 100.

A tube loop 13 (e.g., a coolant loop) extends at least partially within the PCM 28. As shown in FIG. 2, the tube loop 13 can be a coiled tube. The tube loop 13 can include a continuous tube or multiple tubes connected to each other. A liquid can flow through the tube loop 13 and operate as a coolant. In one example, the liquid can be a mixture of glycol and water. In another example, the liquid can be alcohol. The tube loop 13 is in fluid communication with a reservoir 12, a pump 14, and a cold plate or heat exchanger 16. The cold plate or heat exchanger 16 can be a heat exchanger with a large heat transfer area (e.g., microchannels). In operation, the liquid (e.g., coolant) is pumped by the pump 14 past the cold plate or heat exchanger 16 operable to cool the liquid, after which it flows into the thermal conditioning unit 15 and within the PCM 28. The liquid exits the thermal conditioning unit 15 and into the reservoir 12, from which the pump 14 again pumps the liquid past the cold plate or heat exchanger 16. The cold plate 16 is in thermal communication (e.g., operative contact, direct contact, with a thermoelectric module 18 (e.g., one or more Peltier elements). The cold plate 16 and thermoelectric module 18 provide a thermal engine 17. The thermoelectric element 18 is disposed between and in thermal communication with the cold plate or heat exchanger 16 and a heat sink 20. The heat sink 20 can include a heat pipe 21 that extends from the thermoelectric module 18 to one or more fins 23. A fan 22 can flow air past the one or more fins 23 and/or the heat pipe 21 to dissipate heat therefrom to the environment.

In a conditioning phase of operation of the system 100, the thermoelectric module 18 operates (e.g., consumes electricity and are operated by the controller) to remove heat from the cold plate or heat exchanger 16 and transfer the heat to the heat sink 20, where it can be dissipated via air flow as discussed above. The pump 14 is operated (e.g., consumes electricity and is operated by the controller) to flow the liquid past the cold plate 16 to cool the liquid, which then flows through the PCM 28 in the thermal conditioning unit 15. The liquid exits the thermal conditioning unit 15 and into the reservoir 12, from which the pump 14 again pumps the liquid past the cold plate 16 and back into the thermal conditioning unit 15. Operation of the system 100 in this conditioning phase continues until the PCM 28 achieves a desired thermal state (e.g., is completely solidified or frozen, reaches a desired temperature setpoint), as measured by the one or more sensors S1.

Once the PCM 28 reaches the desired thermal state, the system 100 can be operated in a maintenance mode of operation, where a closed loop control keeps the temperature of the PCM 28 substantially constant over a period of time, during which the system 100 is ready and in stand-by mode to cool a hot beverage. In one implementation, during the maintenance mode, the thermoelectric module 18 and/or pump 14 are not operated.

With continued reference to FIG. 1, a tube loop 11 (e.g., warm beverage loop) extends at least partially within the PCM 28. As shown in FIG. 2, the tube loop 11 can be a coiled tube. Loops of the tube loop 11 can optionally be interspersed between loops of the tube loop 13. The tube loop 11 can include a continuous tube or multiple tubes connected to each other. A warm beverage can flow through the tube loop 11 and be cooled by the PCM 28 as the beverage flows through the tube loop 11 within the thermal conditioning unit 15, as further discussed below. The system 100 includes a reservoir 4 that receive the hot beverage (e.g., hot brewed beverage, such as hot coffee or hot tea). The reservoir 4 is in fluid communication with a pump 6, which is in fluid communication with the tube loop 11 via a valve 10. The return branch of the tube loop 11 is in fluid communication with the reservoir 4. The system 100 also optionally includes a heat exchanger 32 (e.g., a beverage to air heat exchanger) with a tube loop 7 via which the hot beverage flows. The heat exchanger 32 can have one or more (e.g., multiple) fins 9 in thermal communication with the tube loop 7 to aid in the heat transfer (e.g., dissipation of heat) from the hot beverage flowing through the tube loop. One or more fans 34, 36 can flow air past the tube loop 7 and/or fins 9 to dissipate heat therefrom. In one implementation, the one or more fans 34, 36 can be a pair of fans. In another implementation, the one or more fans can be a single fan. A return branch of the tube loop 7 is in fluid communication with the reservoir 4 and an inlet branch of the tube loop 7 is in fluid communication with a downstream end of the pump 6 via a valve 8. In another implementation, the heat exchanger 32 is excluded from the system 100.

In a beverage cooling phase of operation of the system 100 (e.g., after the conditioning phase for the PCM 28 has been completed), a hot beverage (e.g., following a brewing process) enters the reservoir 4. One or more temperature sensors S2 in the reservoir 4 can sense a temperature of the beverage therein. Though not shown, the system can have a temperature sensor to sense ambient temperature. Valve 8 is opened, valve 10 is closed and the pump 6 is operated to flow the hot beverage from the reservoir 4 through the tube loop 7 of the heat exchanger 32. The one or more fans 34, 36 are operated to flow air past the tube loop 7 to cool the hot beverage, which is returned to the reservoir 4 and then again pumped by the pump 6 through the tube loop 7 via the valve 8. The hot beverage is circulated through the heat exchanger 32 until the temperature (sensed by temperature sensor(s) S2) reaches a desired temperature setpoint (e.g., a few degrees, such as 2° C., 3° C., above ambient temperature), for example, so that the hot beverage is now a warm beverage. Once the desired temperature setpoint is reached in the reservoir 4, the pump 6 turns off, the valve 8 closes, valve 10 opens, and the pump 6 is operated to flow the warm beverage from the reservoir 4 through the tube loop 11 via the valve 10, where the warm beverage is cooled by the PCM 28, as discussed above. The pump 6 is operated to circulate the beverage between the reservoir 4 and the thermal conditioning unit 25 and through the tube loop 11 until the temperature sensor S2 indicates the beverage has been cooled to a desired temperature (e.g., a temperature below ambient temperature). Once the desired temperature is reached, the cooled or chilled beverage can be dispensed from the reservoir 4 to a drinkware container (e.g., cup, mug, glass, etc.). The system 100 can be operated to deliver a number of servings of cooled or chilled beverages until the PCM 28 needs to be charged again, at which point the system 100 is again operated in the conditioning phase of operation discussed above.

Figure 6:
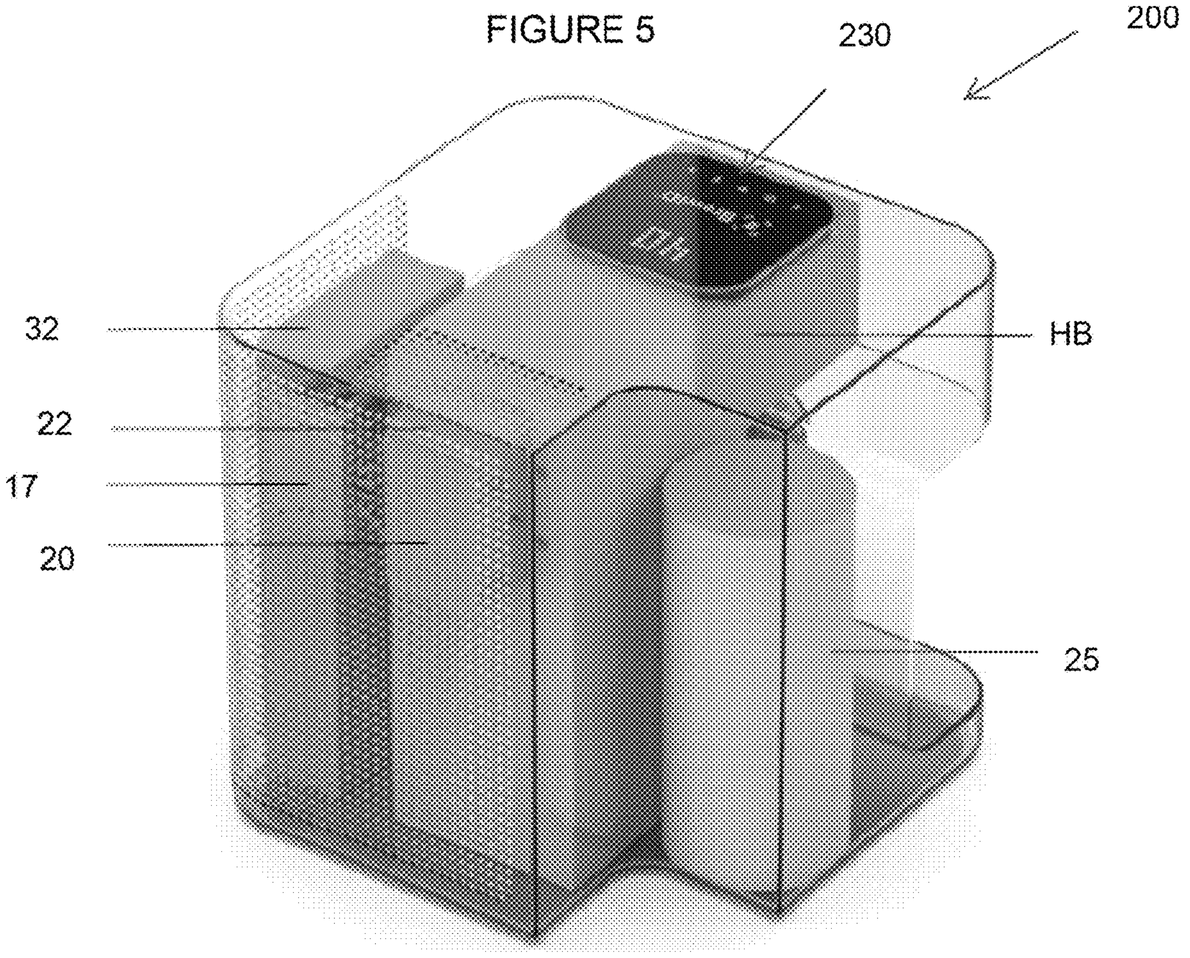
FIG. 6 is a schematic perspective view of the beverage dispensing machine of FIG. 3 showing an outer housing of the machine as transparent to illustrate the chilled beverage dispensing system in the machine.

In one implementation, the system 100 can be incorporated into a beverage dispensing machine 200, as shown in FIGS. 3-6. The beverage dispensing machine 200 can prepare a hot beverage (e.g., a hot coffee, hot tea) and the hot beverage then passed through the system 100 so that the beverage that is dispensed from the dispensing nozzle 205 over the drip pan or receiving portion 220 of the machine 200 is a cool or chilled beverage. The beverage dispensing machine 200 can include a water reservoir 210 and a user interface 230 via which the user can select the beverage to be dispensed, such as a hot beverage or a chilled or cooled beverage. FIG. 6 illustrated on example of an arrangement of components within the beverage dispensing machine 200, which can include the hot beverage unit HB, the thermal conditioning unit 25, heat exchanger 32, thermal engine 17, fan 22 and heat sink 20.

In another implementation, the system 100 can be a standalone system that receives a beverage at a higher temperature in the reservoir 4 and dispenses a chilled or cooled beverage. The system 100 can be used to chill or cool various types of beverages (e.g., coffee, tea).

Figure 7:
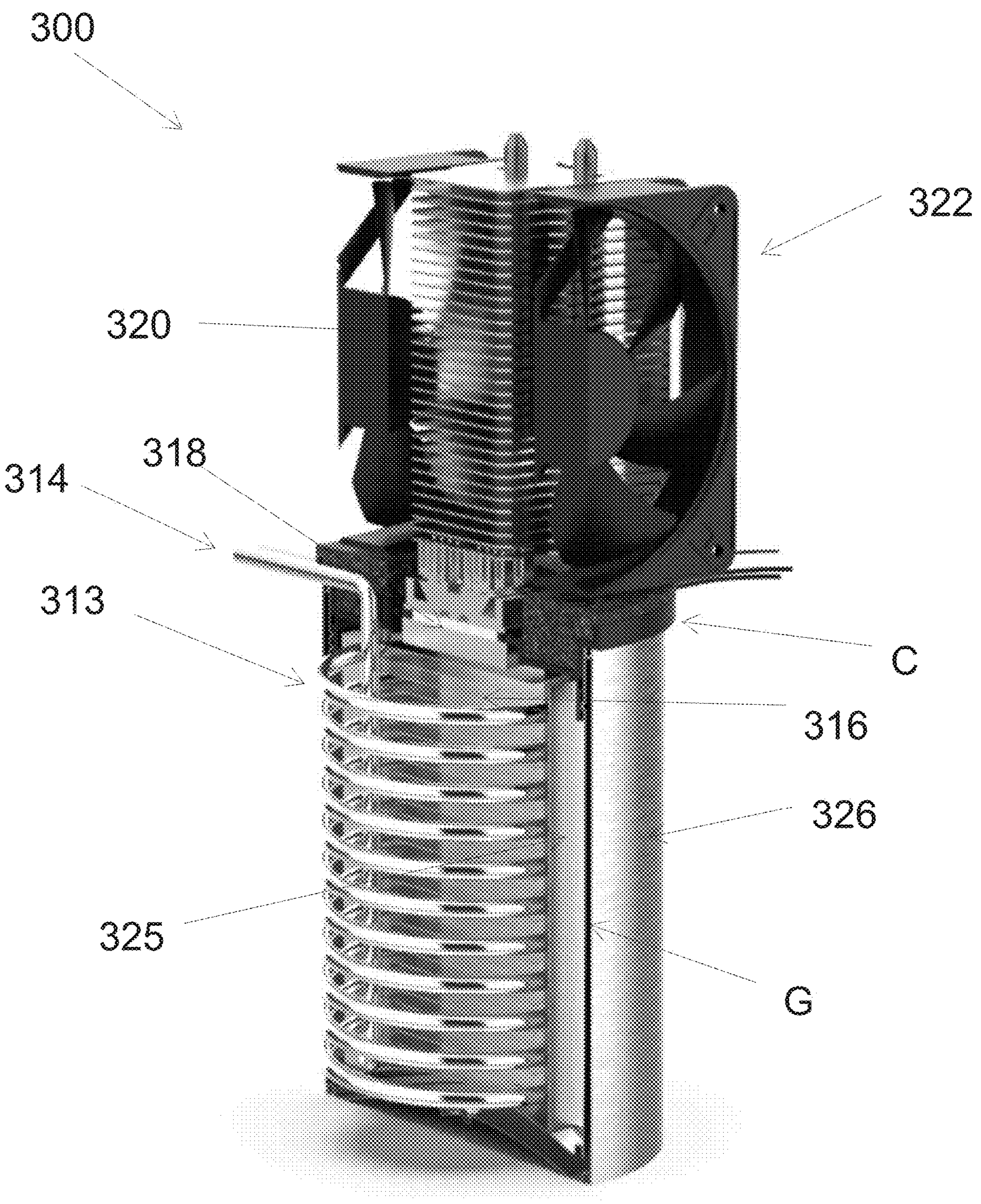
FIG. 7 is a schematic perspective view of a chilled beverage dispensing system.
Figure 8:
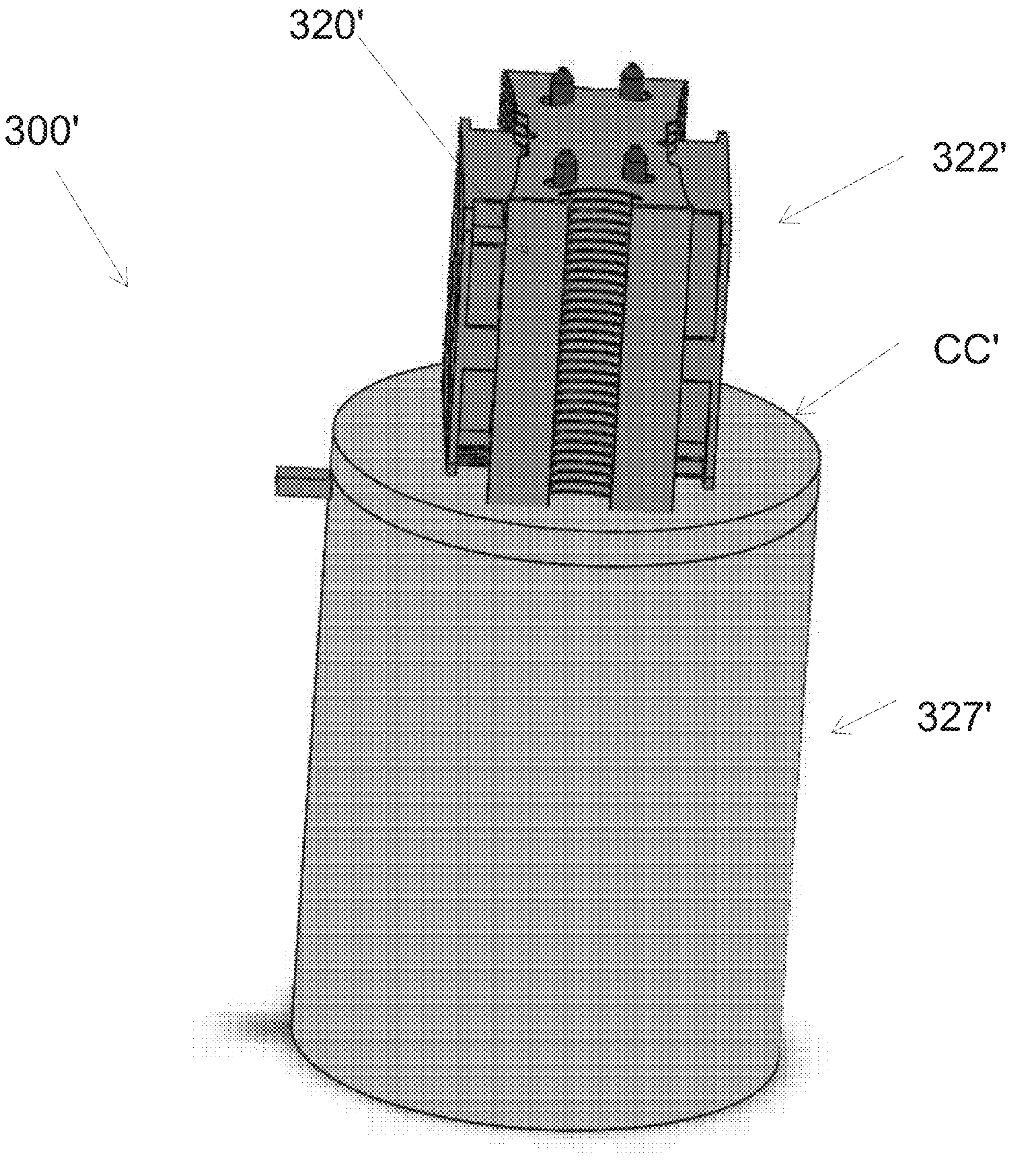
FIGS. 8-15 show schematic views of a chilled beverage dispensing system.
Figure 9:
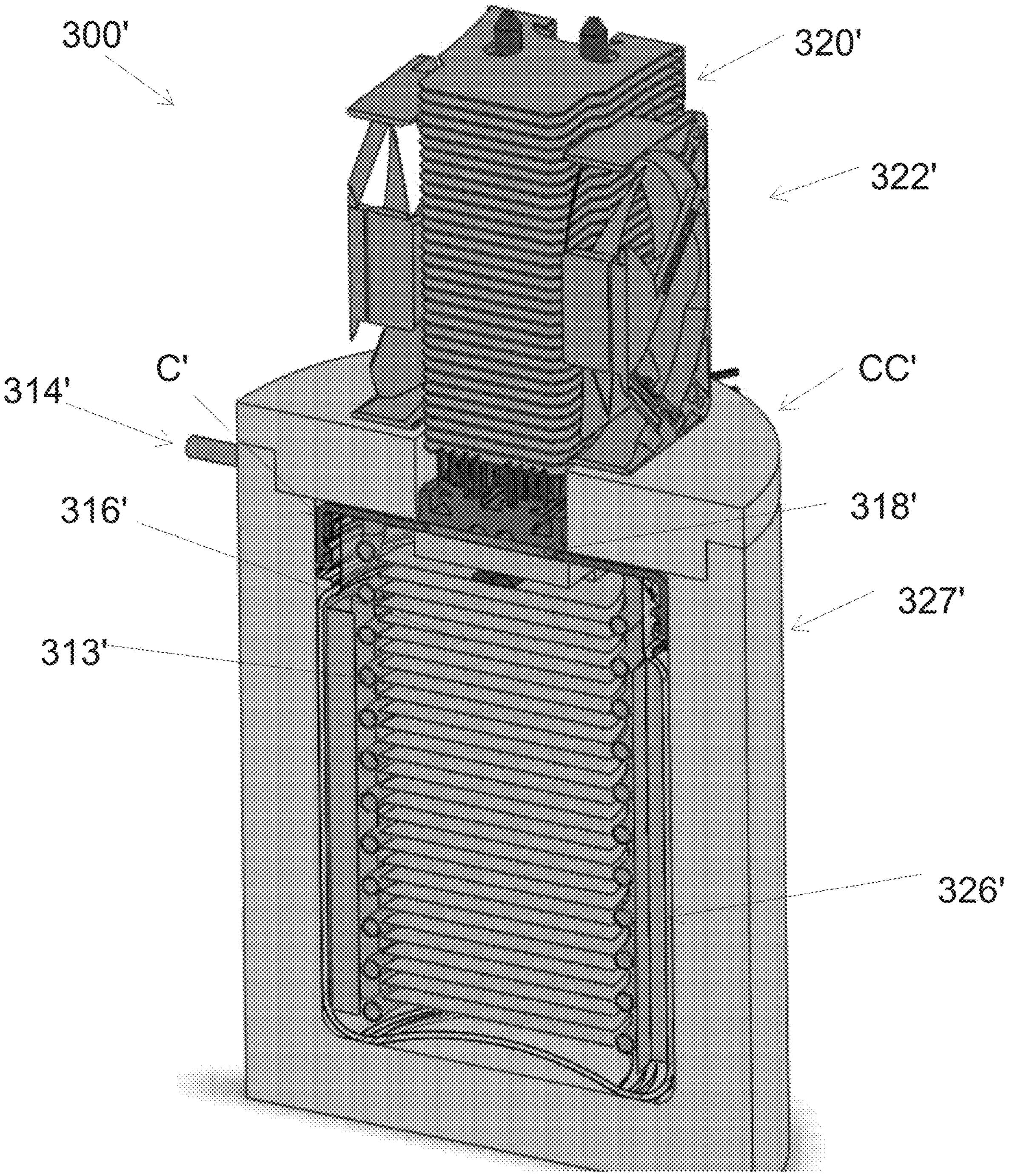
Figure 10:
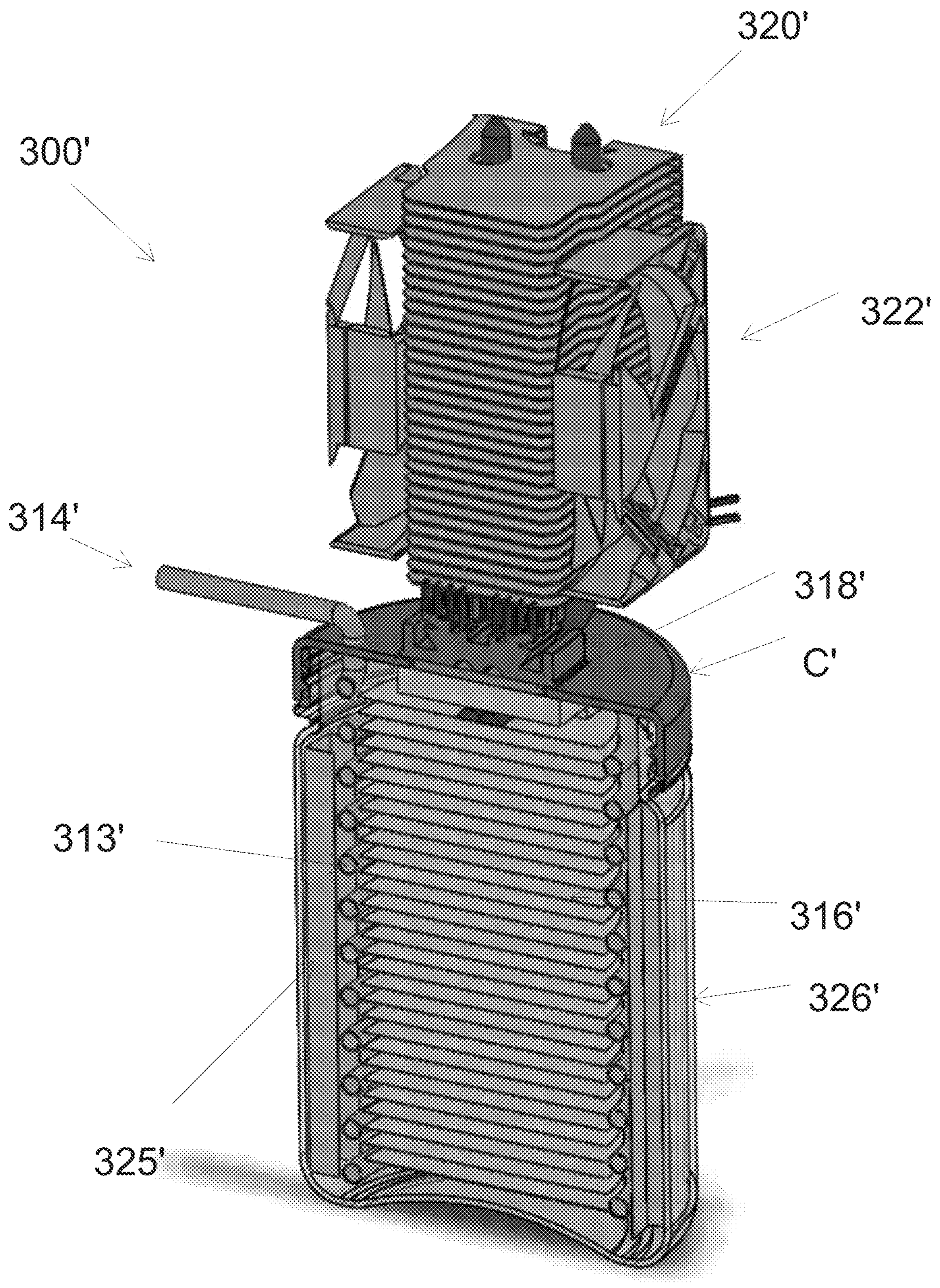

FIG. 7 shows a chilled liquid dispensing system 300 (e.g., chilled beverage dispensing system). The system 300 includes a vessel 326. In one example, the vessel 326 is insulated (e.g., vacuum insulated). The vessel 326 can be a double-walled vessel 326. In one example, the vessel 326 is a double-walled vacuum insulated vessel 326 with a gap G defined between double walls of the vessel 32, the gap G being under vacuum. The vessel 326 (e.g., a chamber of the vessel 326) can be filled with a phase change material (PCM). The PCM can be a liquid-to-solid PCM. The PCM can have a transition temperature that is lower than the temperature at which the chilled beverage is to be served. The system 300 can optionally have a heat spreader 325 can be disposed in the vessel 326 and submerged in the PCM; the heat spreader 325 can facilitate heat transfer with the PCM, as further discussed below. In one example, the heat spreader 325 is excluded.

A conduit or tube 313 (e.g., a tube loop or continuous tube spiral with multiple spaced apart tube loops) via which the beverage is circulated is disposed in the vessel 326 and submerged in the PCM (e.g., so that the PCM is in contact with the tube 313). The beverage (as warm liquid) can enter the tube 313 via inlet 314 and can exit the tube 313 (as a cooled or chilled beverage) via an outlet (not shown). The tube 313 can extend about a heat sink 316 (e.g., cold side heat sink) that is also submerged in the PCM. The heat sink 316 can optionally have one or more (e.g., multiple) fins to facilitate heat transfer with the PCM. Optionally, the heat sink 316 can have one or more heat pipes to enhance the rate of heat transfer (as further discussed below). The heat sink 316 can be in thermal communication (e.g., thermal contact, operative contact, direct contact) with a side of a thermoelectric module 318 (e.g., a thermoelectric cooler or TEC, one or more Peltier elements). The heat sink 316 can also be in thermal communication (e.g., thermal contact) with the heat spreader 325 (e.g., when the heat spreader 325 is included in the chilled beverage dispensing system 300). A heat sink 320 (e.g. hot side heat sink) can be in thermal communication (e.g., thermal contact, operative contact, direct contact) with an opposite side of the thermoelectric module 318. The heat sink 320 can optionally have one or more (e.g., multiple) fins to facilitate heat transfer. The system 300 can also have one or more (e.g., two) fans 322 operable to flow air past the heat sink 320 to remove heat from the heat sink 320. The vessel 326 can be closed with a cover C, the heat sink 320 extending through the cover C. In some examples, the fans are excluded and the heat sink 320 is exposed to ambient air or exposed to an alternate source of moving air.

In operation, during a conditioning phase, the thermoelectric module 318 is operated so that the side of the thermoelectric module 318 adjacent the heat sink 316 is cold and the side of the thermoelectric module 318 adjacent the heat sink 320 is hot. This allows the thermoelectric module 318 to pump heat out of the PCM in the vessel 326 via the heat sink 316 (and via the optional heat spreader 325) to thereby charge (e.g., solidify, freeze) the PCM (e.g., over a period of time). The heat spreader 325 can advantageously facilitate (e.g., aid in, make possible) the uniform freezing or charging of the PCM. The heat spreader 325 can extend circumferentially about an axis of the vessel 326 (e.g., can be a continuous sheet of thermally conductive material, for example forming spaced apart channels or a folded fin structure). The thermoelectric module 318 pumps the heat from the PCM to the heat sink 320, and the fan(s) 322 operate to remove heat from the heat sink 320 and transfer it to the surrounding environment.

Once the PCM is charged, the beverage (e.g. warm liquid) can be pumped by a pump (not shown) through the tube 313 that is submerged in the charged PCM. As the beverage flows through the tube 313, the charged (e.g., frozen) PCM absorbs heat from the beverage, thereby cooling or chilling the beverage. The heat absorbed by the charged (e.g., frozen) PCM causes the PCM to transition to a liquid (e.g. melt). After a certain volume of beverage is chilled, the PCM fully melts and loses thermal capacity to chill the beverage any further. At this point, the conditioning phase of the PCM can be repeated to charge (e.g., freeze) the PCM again.

In one implementation, the system 300 can be incorporated into a beverage dispensing machine 200, as shown in FIGS. 3-6 (e.g., the beverage can enter the tube 313 via the inlet 314 following exiting a brewing unit of the beverage dispensing machine and exits via an outlet at an opposite end of the tube 313). In another implementation, the system 300 can be a stand alone unit for chilling beverages (e.g., a tabletop unit) that is separate from a beverage brewing machine (e.g., a coffee maker, tea maker, etc.).

FIGS. 8-15 show features of a chilled beverage dispensing system 300' (hereafter "the system 300'"). The system 300' is similar to the system 300 in FIG. 7. Thus, reference numerals used to designate the various components of the system 300' are identical to those used for identifying the corresponding components of the system 300 in FIG. 7, except that a "'" has been added to the end of the numerical identifier. Therefore, the structure and description for the various features and components of the system 300 and how they're operated and controlled in FIG. 7 are understood to also apply to the corresponding features of the system 300' in FIGS. 8-15, except as described below. Optionally, the chilled beverage dispensing system 300' can be incorporated into a beverage dispensing machine (e.g., beverage dispensing machine 200). In one example, the chilled beverage dispensing system 300' can be removably disposed in a beverage dispensing machine (e.g., can be removed as a unit from the beverage dispensing machine).

Figure 11:
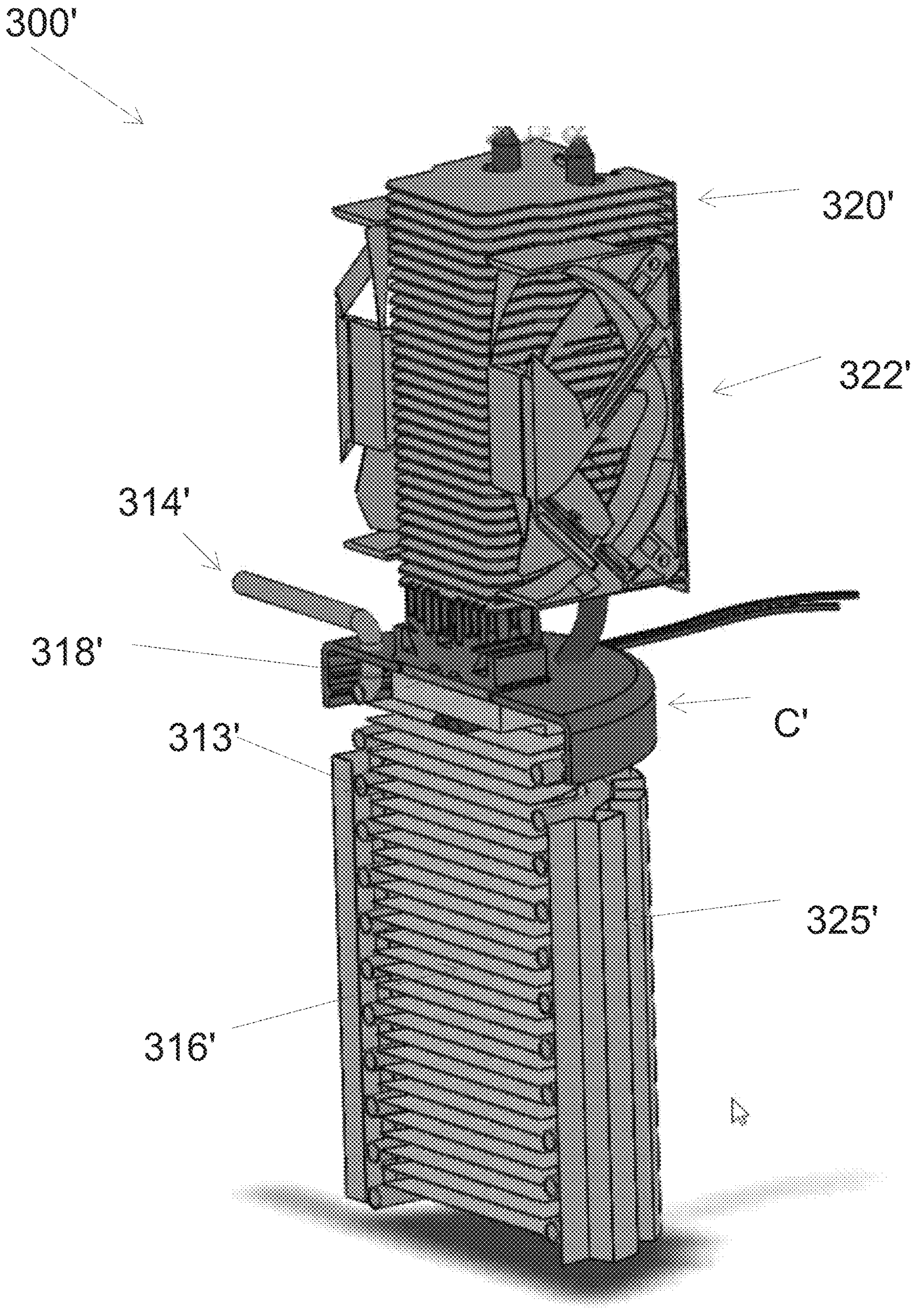
Figure 12:
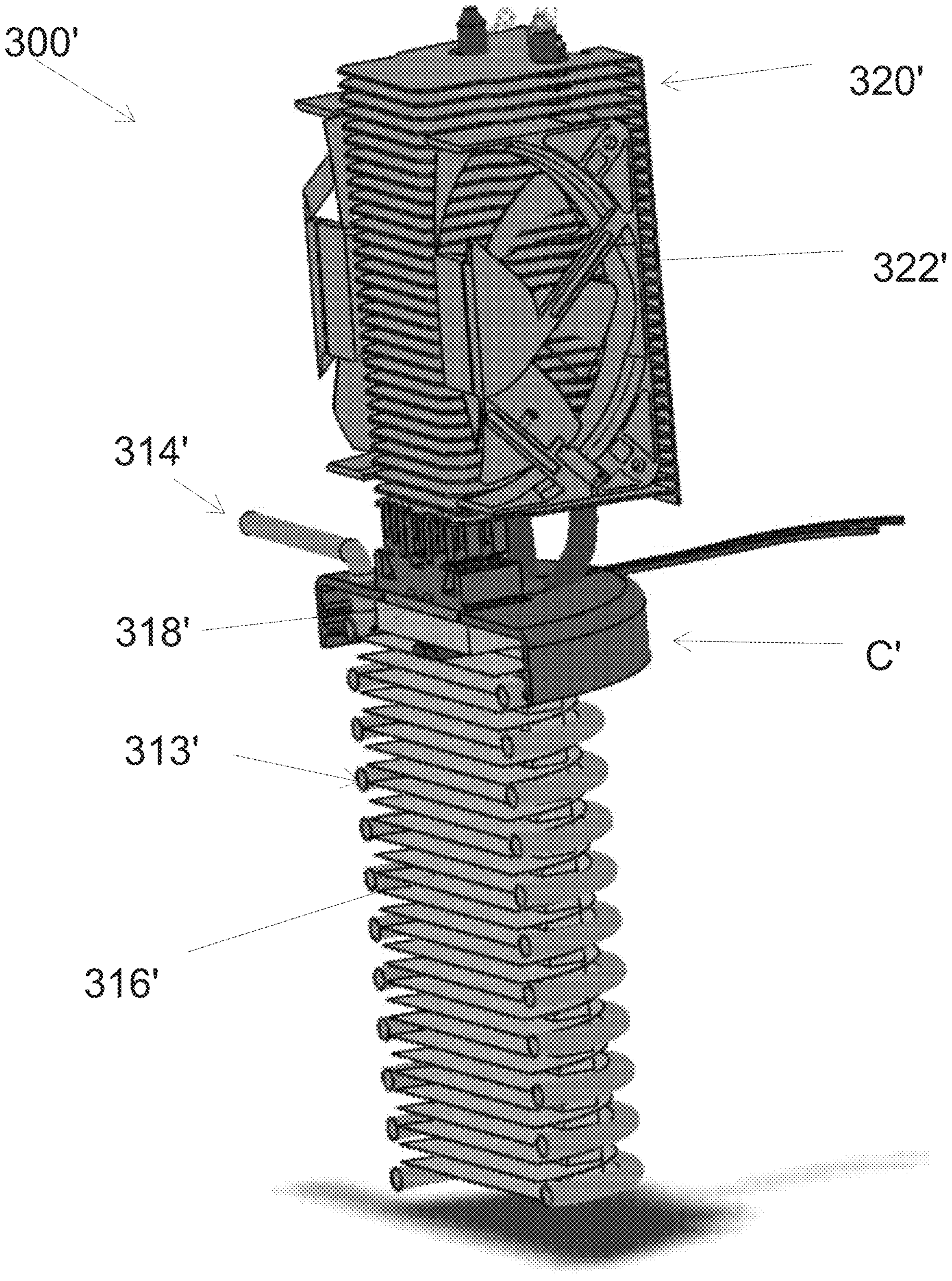
Figure 13:
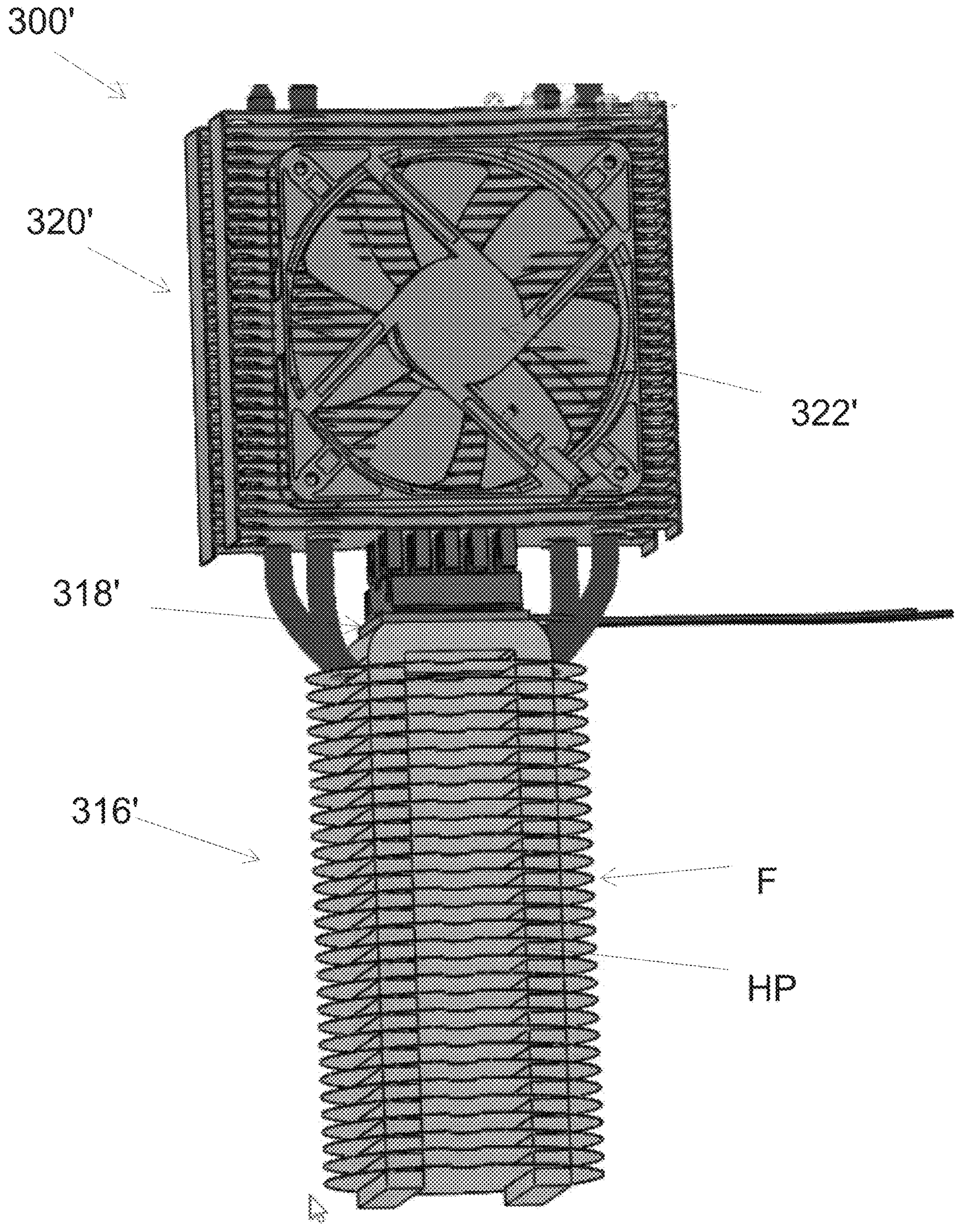
Figure 14:
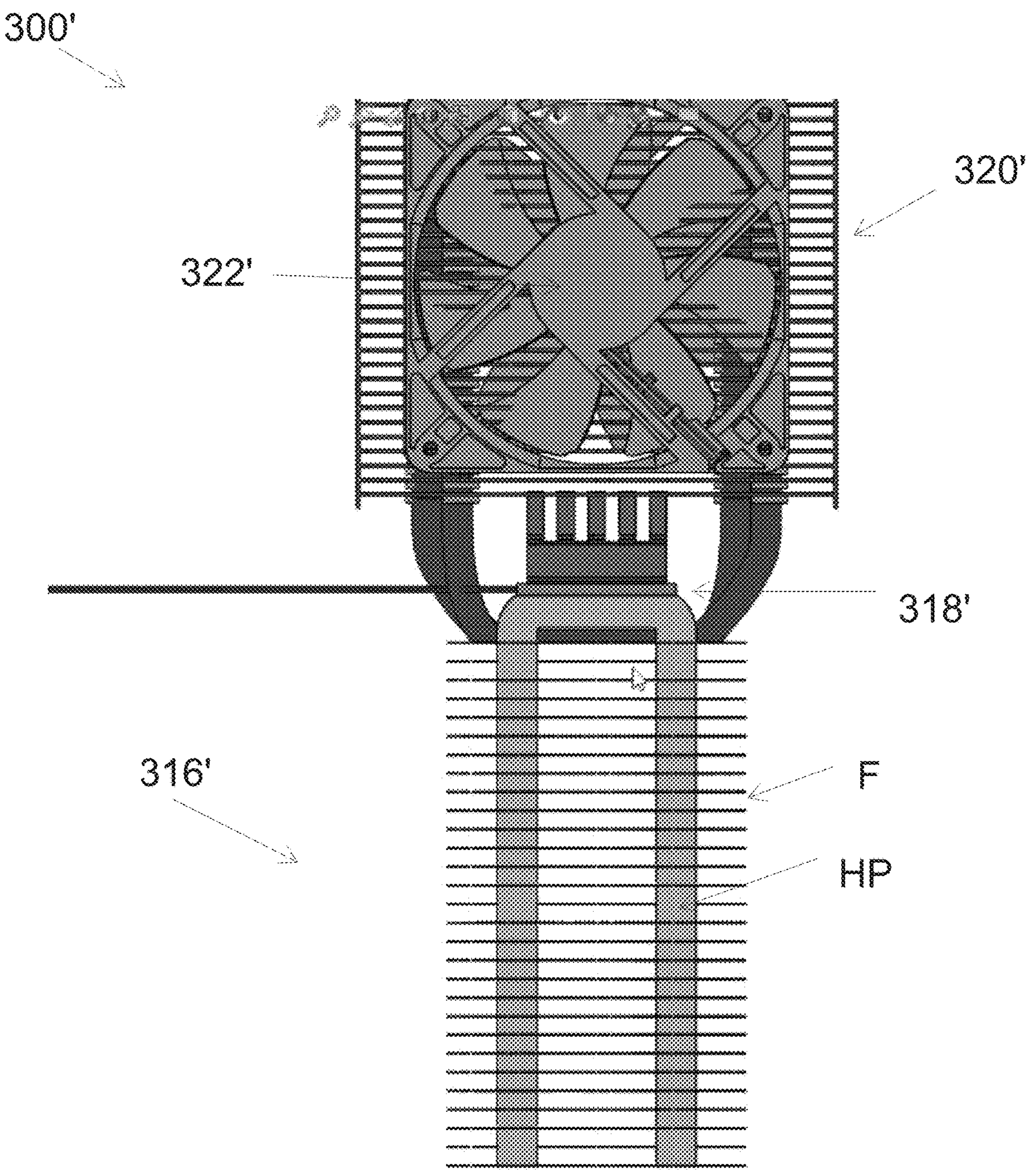
Figure 15:
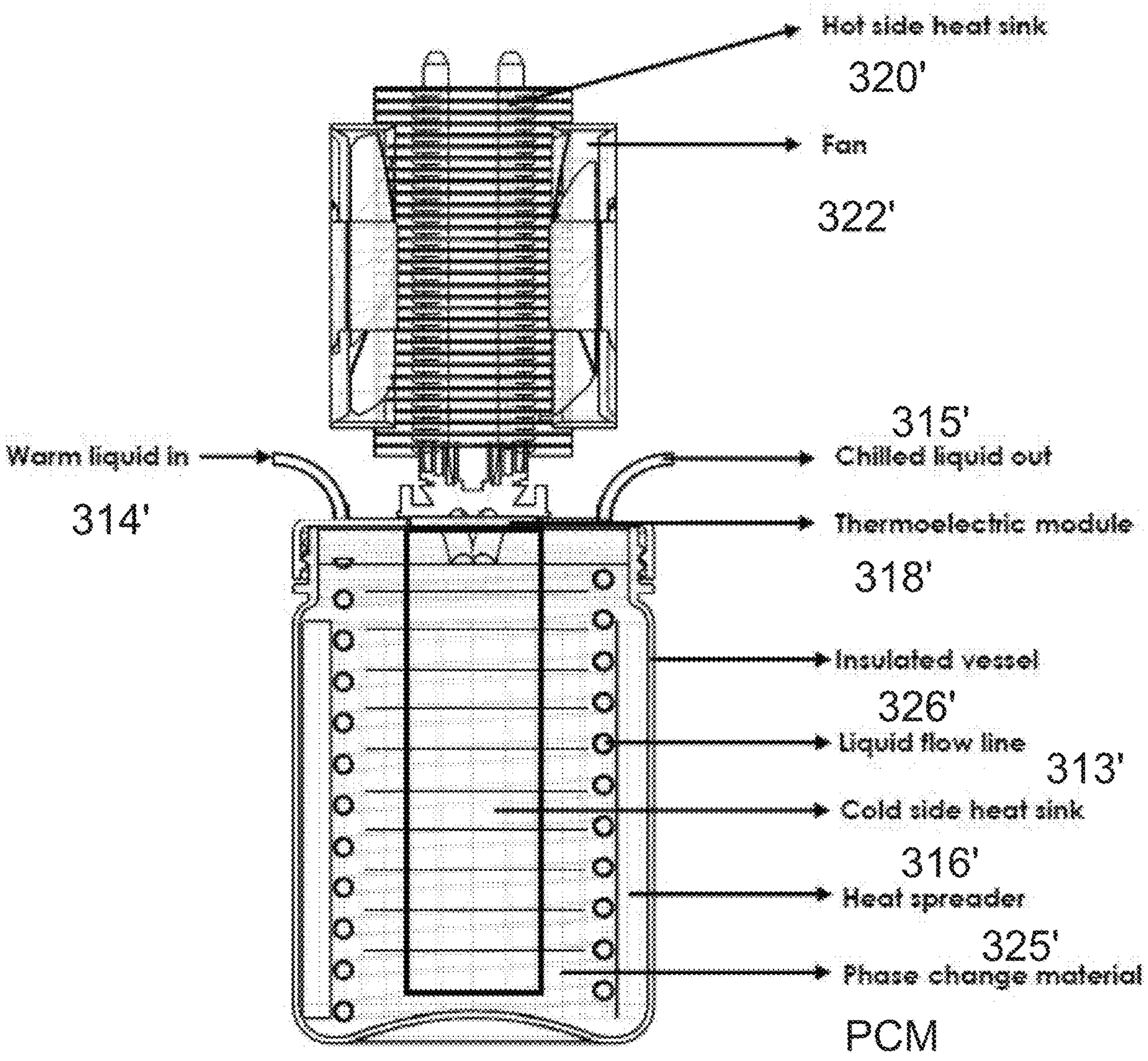

The system 300' differs from the system 300 in that the vessel 326' is surrounded by an insulated vessel 327' (e.g., made of foam, expanded polystyrene, or other suitable insulation material). Similarly, the cover C' is covered by an insulated cover CC' (e.g., made of foam, expanded polystyrene, or other suitable insulation material). In another implementation, one or both of the vessel 326' and the insulated vessel 327' can be replaced by a double-walled vacuum insulated vessel. As shown in FIG. 11, the heat spreader 325' can have a folded fin structure that extends around the tube 313' (e.g., a tube loop or continuous tube spiral with multiple spaced apart tube loops). As shown in FIG. 13, the heat sink 316' can include fins F and one or more heat pipe(s) HP to enhance rate of heat transfer with the PCM. In another implementation, the heat sink 316' can exclude fins. The heat pipe HP can in one example be made of aluminum (e.g., aluminum acetone). However, the heat pipe HP can be made of other suitable heat conducting materials. The beverage can enter the tube 313' (e.g., as warm liquid, such as following brewing of the beverage) via the inlet 314' and exit the tube 313' (e.g., as chilled liquid, chilled beverage) via the outlet 315' (both extending through the cover C'), as shown in FIG. 15.

Figure 16:
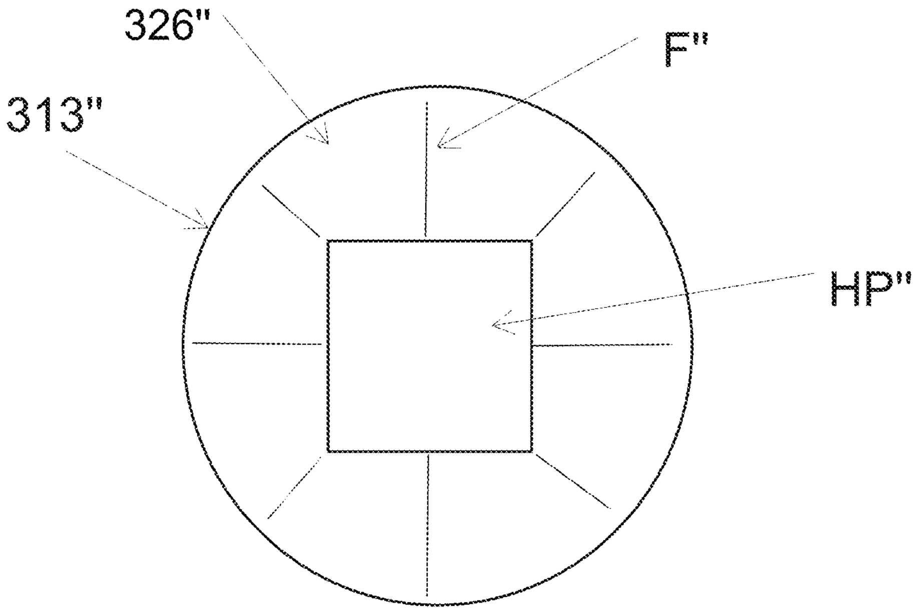
FIG. 16 shows a schematic end view of a cold side heat sink for use with a chilled beverage dispensing system.

FIG. 16 shows a variation of the heat sink 316" that is surrounded by the tube 313" (e.g., a tube loop or continuous tube spiral with multiple spaced apart tube loops). The heat sink 316" can be an extrusion of a heat pipe HP" with fins F" extending (e.g., radially) from the heat pipe HP" (e.g., along the length of the heat pipe HP"). The heat sink 316" can have the same cross-sectional shape along its length.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A chilled liquid dispensing system, comprising:

an insulated vessel having a chamber containing a phase change material;

a conduit disposed in the chamber of the insulated vessel and having a portion submerged in the phase change material so that the phase change material is in thermal contact with an outer surface of the portion of the conduit, the conduit configured to receive therethrough a liquid at a first temperature above an ambient temperature that cools as it flows through the conduit and heat is transferred to the phase change material to cool the liquid to a second temperature below the ambient temperature;

a first heat sink disposed in the chamber of the insulated vessel and submerged in the phase change material so that the phase change material is in thermal contact with an outer surface of the first heat sink;

a thermoelectric module having one side in thermal communication with the first heat sink; and a second heat sink disposed outside the chamber of the insulated vessel and in thermal communication with an opposite side of the thermoelectric module, wherein the thermoelectric module is operable to charge or freeze the phase change material by pumping heat out of the phase change material via the first heat sink and into the second heat sink, wherein the first heat sink includes one or more heat pipes that are submerged in the phase change material, and wherein the first heat sink includes one or more fins extending from the one or more heat pipes, the one or more fins being submerged in the phase change material.

2. The system of claim 1, wherein air flows past the second heat sink to remove heat from the second heat sink.

3. The system of claim 2, further comprising one or more fans operable to flow air past the second heat sink to remove heat from the second heat sink.

4. The system of claim 1, wherein the conduit comprises a continuous tube spiral with multiple spaced apart tube loops, the continuous tube spiral extending circumferentially about the first heat sink within the chamber.

5. The system of claim 1, wherein the insulated vessel is a double-walled vacuum insulated vessel.

6. The system of claim 1, further comprising a second insulated vessel surrounding the insulated vessel.

7. The system of claim 1, further comprising a cover configured to close the insulated vessel, the second heat sink extending through the cover.

8. The system of claim 7, wherein an inlet and an outlet of the conduit extend through the cover.

9. The system of claim 8, further comprising an insulated cover configured to cover the cover.

10. The system of claim 1, wherein the one or more heat pipes are two spaced apart heat pipes.

11. The system of claim 1, wherein the one or more fins are a plurality of fins that extend perpendicular to the one or more heat pipes.

12. The system of claim 1, wherein the one or more fins extend radially from the one or more heat pipes and along a length of the one or more heat pipes.

13. A chilled liquid dispensing system, comprising:

an insulated vessel having a chamber containing a phase change material;

a conduit disposed in the chamber of the insulated vessel and having a portion submerged in the phase change material so that the phase change material is in thermal contact with an outer surface of the portion of the conduit, the conduit configured to receive therethrough a liquid at a first temperature above an ambient temperature that cools as it flows through the conduit and heat is transferred to the phase change material to cool the liquid to a second temperature below the ambient temperature;

a first heat sink disposed in the chamber of the insulated vessel and submerged in the phase change material so that the phase change material is in thermal contact with an outer surface of the first heat sink;

a thermoelectric module having one side in thermal communication with the first heat sink;

a second heat sink disposed outside the chamber of the insulated vessel and in thermal communication with an opposite side of the thermoelectric module; and a heat spreader attached to the first heat sink, disposed in the chamber and extending circumferentially about an axis of the insulated vessel, wherein the thermoelectric module is operable to charge or freeze the phase change material by pumping heat out of the phase change material via the first heat sink and into the second heat sink.

14. The system of claim 13, wherein the heat spreader extends circumferentially about the conduit, the conduit comprising a continuous tube spiral with multiple spaced apart tube loops.

15. The system of claim 13, wherein the heat spreader includes a plurality of folded fins.

16. The system of claim 1, further comprising:

a reservoir configured to receive a liquid at a first temperature above an ambient temperature; and a heat exchanger operable to receive the liquid from the reservoir and to cool the liquid to a second temperature below the first temperature and above the ambient temperature by flowing air past a second conduit within which the liquid is configured to flow, the second conduit being upstream of an inlet to the conduit.

17. A beverage dispensing machine, comprising the chilled liquid dispensing system of claim 1.

18. The beverage dispensing machine of claim 17, further comprising a housing, and a hot beverage brewing unit disposed in the housing, the chilled beverage dispensing system disposed in the housing and in fluid communication with the hot beverage brewing unit.

19. The beverage dispensing machine of claim 17, wherein the chilled liquid dispensing system is removable as a unit.

* * * * *